United States Patent

Woodall

(10) Patent No.: US 8,891,010 B1
(45) Date of Patent: Nov. 18, 2014

(54) ENCODING FOR SUPER RESOLUTION PLAYBACK

(75) Inventor: Neil D. Woodall, Newport Beach, CA (US)

(73) Assignee: Pixelworks, Inc., Portland, OR (US)

( * ) Notice: Subject to any disclaimer, the term of this patent is extended or adjusted under 35 U.S.C. 154(b) by 0 days.

(21) Appl. No.: 13/607,399

(22) Filed: Sep. 7, 2012

Related U.S. Application Data

(63) Continuation-in-part of application No. 13/194,860, filed on Jul. 29, 2011.

(51) Int. Cl.
*H04N 7/12* (2006.01)

(52) U.S. Cl.
USPC .......................................... 348/446; 348/445

(58) Field of Classification Search
CPC ...................................................... H04N 7/012
USPC .......................................................... 348/446
See application file for complete search history.

(56) References Cited

U.S. PATENT DOCUMENTS

| | | | |
|---|---|---|---|
| 6,340,994 B1 * | 1/2002 | Margulis et al. | 348/625 |
| 2009/0110285 A1 * | 4/2009 | Elad et al. | 382/190 |
| 2009/0274380 A1 * | 11/2009 | Wedi | 382/233 |
| 2010/0067873 A1 * | 3/2010 | Sasaki et al. | 386/95 |

\* cited by examiner

*Primary Examiner* — Jefferey Harold
*Assistant Examiner* — Justin Sanders
(74) *Attorney, Agent, or Firm* — Marger Johnson & McCollom PC

(57) ABSTRACT

A method of displaying video data includes receiving, at a timing controller, a frame of pixel data at a resolution lower than the display resolution from an application processor, generating new frames of video data at the timing controller by applying a filter with a different set of coefficients to at least one neighboring frame at the lower resolution to generate a display frame of video data at a higher resolution. A video processing device has an application processor to execute instructions causing the application process to transmit frames of image data at a resolution lower than an original resolution, and a timing controller to execute instructions causing the timing controller to reconstruct frames of image data at the original resolution from the frames of lower resolution.

11 Claims, 10 Drawing Sheets

ENCODING FOR SUPER RESOLUTION PLAYBACK

RELATED APPLICATIONS

This application is a continuation in part of, and claims priority to, U.S. patent application Ser. No. 13/194,860, filed Jul. 29, 2011, incorporated by reference here in its entirety.

BACKGROUND

Super resolution playback involves displaying images at higher resolution than what is transmitted. Super resolution allows the display of a higher quality image in the same amount of bandwidth by using information on how the lower resolution (broadcast) image was created. However, practical use of super resolution with current broadcast encoding is limited.

A major issue arises in the transmission of images. Many techniques reduce the bandwidth on transmission, often resulting in loss of the high frequency content. Without any high frequency content, the super resolution processes cannot easily recover any further details. This defeats the purpose of super resolution that aims to increase the detail.

A common broadcast technique to reduce bandwidth is generating an interlaced picture. This can reduce the bandwidth by one half. For example, 1280×720 progressive images take as much bandwidth as a 1920×1080 interlaced picture. At the time it was developed, interlacing solved the issue of flicker caused by large bright areas on the display by allowing a higher frame rate for a given amount of resolution. Interlacing refreshed these areas more frequently, which reduced flicker. When the primary display device was a CRT, no special processing was required to handle the interlaced format. The raster scan was simply shifted by ½ line between fields to maintain the correct vertical alignment. However, fixed pixel devices, unlike cathode ray tube devices, have to de-interlace the fields prior to display. This has led the move to progressive image formats for transmissions. In addition, images transmitted across the Internet for display on computing devices, generally transmit as progressive images.

Interlace transmission can be thought of as an extreme example of how to encode an image for super resolution playback. Each field is a lower resolution version of the original and contains alias components that change from field to field. The deinterlacer needs to know how it was encoded or which field contains even or odd lines and whether there is motion. Unfortunately, interlaced transmission is difficult for typical computer devices to display without sophisticated per pixel processing.

What is needed is a method to reduce high resolution images to a lower resolution image in a way that is compatible with existing progressive video playback while allowing for the higher resolution images that are possible using interlaced transmission.

DETAILED DESCRIPTION OF THE EMBODIMENTS

Figure 1:
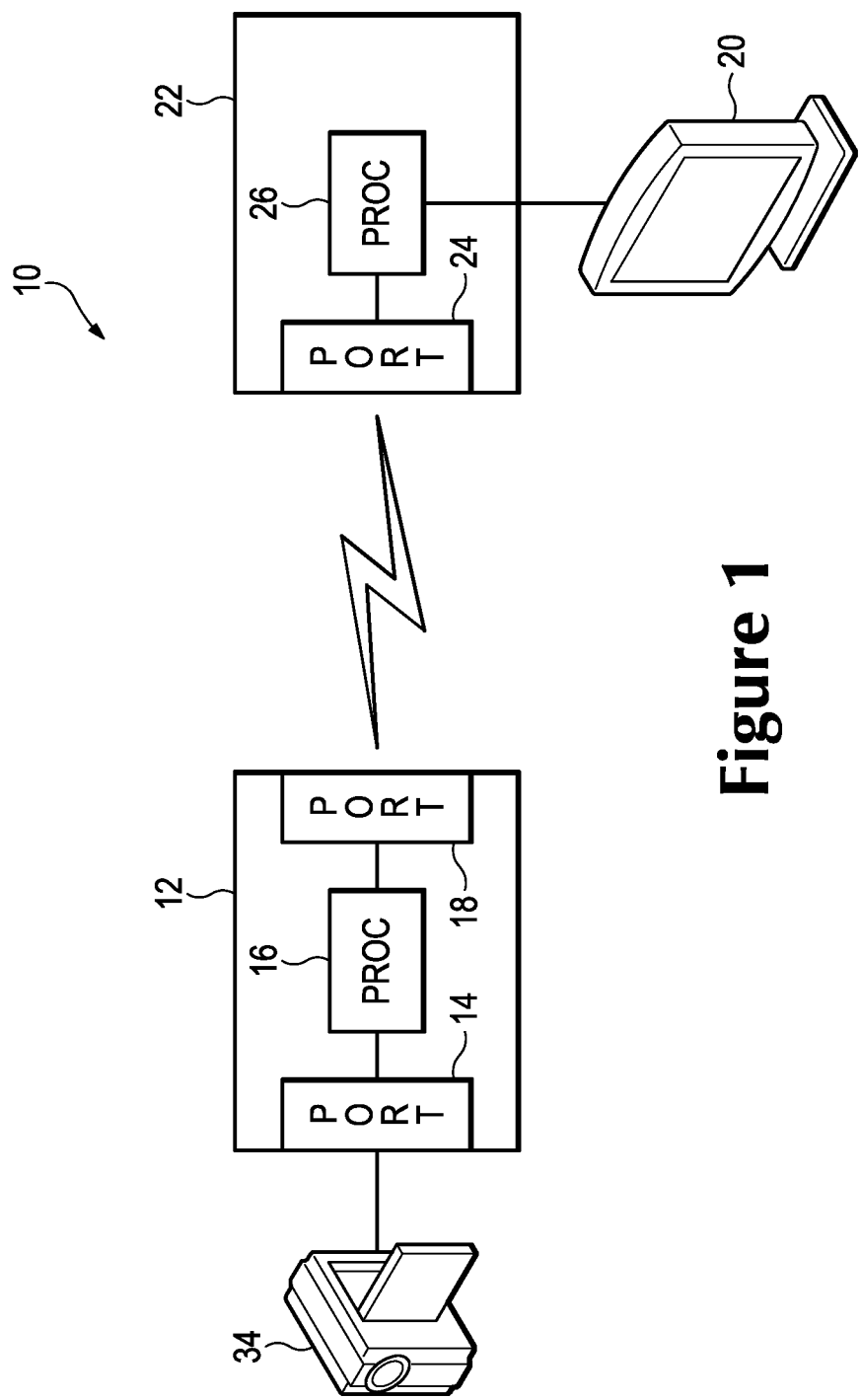
FIG. 1 shows an embodiment of a video image transmission and display system.

FIG. 1 shows an example of a video transmission and display system 10. The video transmission system may consist of an image capture device, such as a camera 34. The camera may be part of many different types of devices, such as a laptop having an integrated camera, a cell phone, a digital video recording, etc. The captured image data arrives at the video transmission device 12 through a port 14. The various captured image devices may communicate with the video transmission device through wired or wireless communication links, or may be part of the same device. The same device could be a cell phone, where the methods applied here would be used to assist in uploading data.

Generally, the video transmission device 12 will downsample and filter the high resolution video data to low resolution video data before it encodes and transmits the video data. The transmission will include information on how the low resolution image underwent filtering before encoding and transmission.

The processor 16 may consist of a graphics processing unit (GPU) or central processing unit (CPU) in some embodiments. In other embodiments, the processor may consist of a special purpose processor, such as a video processor, or a dedicated set of hardware components configured to function as a circuit. Once the processor has finished downsampling the data, it encodes the data and transmits it through a communication port such as 18. The ports 14 and 18 may actually consist of the same port, but for ease of discussion are shown separately.

The video display device 22 will generally consist of several components, but at a minimum will include a port 24 through which the low resolution video data is received. The processor 26 may be one of several options, as mentioned above. The processor 26 will reconstruct the high resolution video data from the low resolution video data received. Once the high resolution video data has been reconstructed by a super resolution process, the video display device 22 will send the data to the actual display panel 20 for display.

Figure 2:
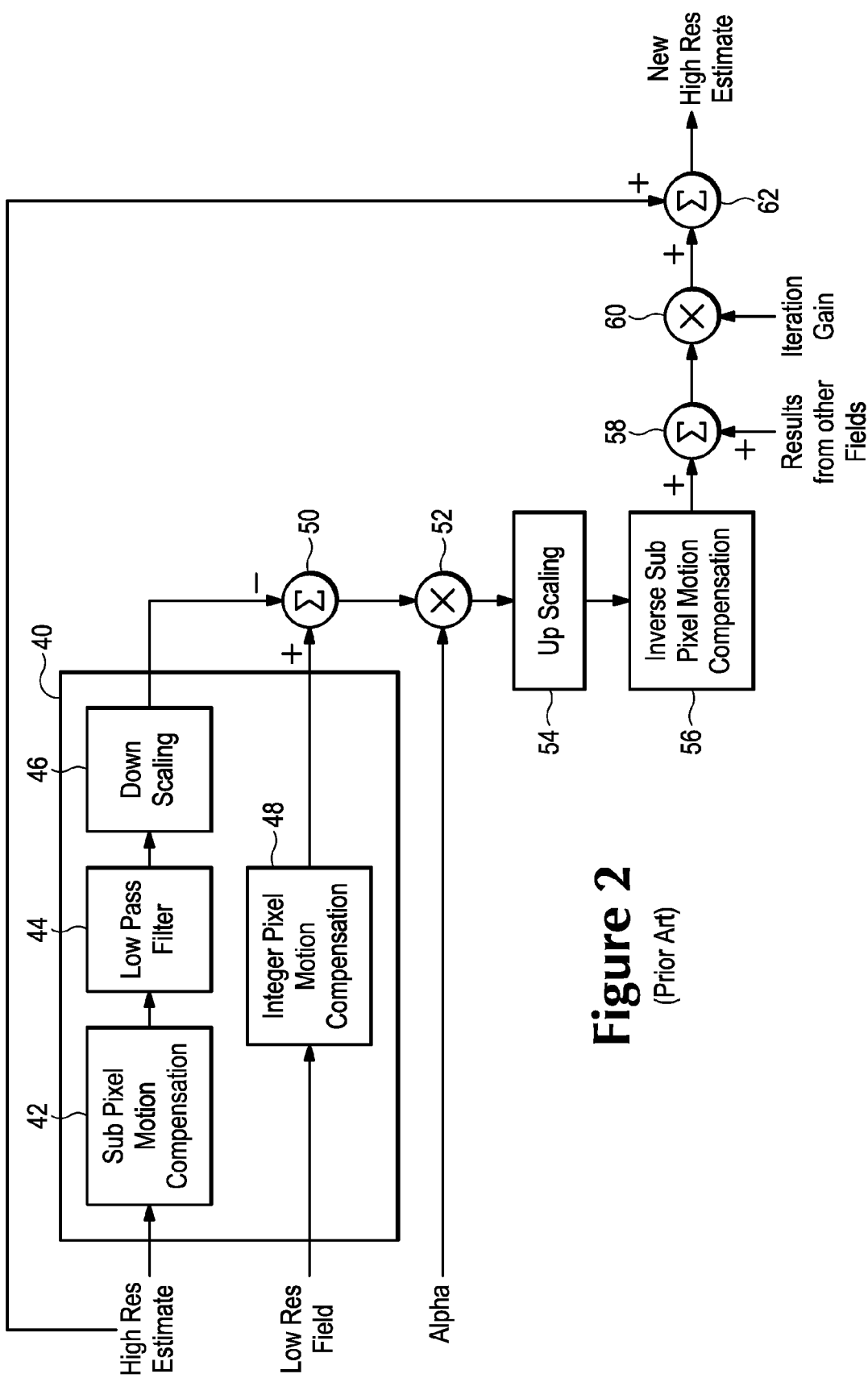
FIG. 2 shows a block diagram of a current method of producing a super resolution video image stream.

Generally, a super resolution process creates an initial guess or estimate of the original image, such as by performing a polyphase filter up scale, then applying the process used to create the low resolution image received. FIG. 2 shows an example of such a process in a high resolution to low resolution model 40. The high resolution estimate undergoes sub-pixel motion compensation at 42, low pass filtering at 44 and downsampling at 40. This produces an estimated low resolution version of the high resolution estimate.

The originally received low resolution field undergoes integer pixel motion compensation at 48 and is differenced to the estimated low resolution video data at 50. This difference represents a low resolution version of the errors in the original high resolution estimate. A per-pixel weighing factor, alpha (α), is applied at 52. The alpha value includes weighting components derived from the spatial location in the block, motion vector quality, and other measurements of how confident the algorithm is that the two pixels used to create the difference belong to the same part of the same object in the image. The resulting data is then upscaled at 54 and undergoes inverse sub-pixel motion compensation at 56.

Results from other fields are combined into the current estimate data at 58 and an iteration gain added at 60. Note that frames consist of one or more fields. If the video is in the progressive format then there is one field per frame. Finally, the original high resolution estimated video data is added back in and the new high resolution estimate at 62 creates an input for further iterations. Typically, as few as three iterations results in the final high resolution image to display.

Current multi-frame super resolution processes have issues. For example, using simple interlace encoding will cause incompatibilities with many multi-function devices that are capable of video playback. Another issue arises in that most super resolution processes rely upon some motion in the content. Super resolution processes for video conferencing data or desk top sharing may find the data unacceptable as the static portions of the resulting image will remain at the lower resolution.

Embodiments described here filter the data prior to interlacing at the transmission end in such a way that the picture appears to be a progressive picture to playback devices without super resolution capabilities. At the same time super resolution devices can recover almost all of the original detail. For example, current three dimensional (3D) broadcasts cut the resolution in half in either the horizontal or vertical direction. With appropriate filtering before cutting the resolution, the super resolution processes can recover the original detail such that resolution does not decrease for a 3D broadcast versus a 2D broadcast.

Figure 3:
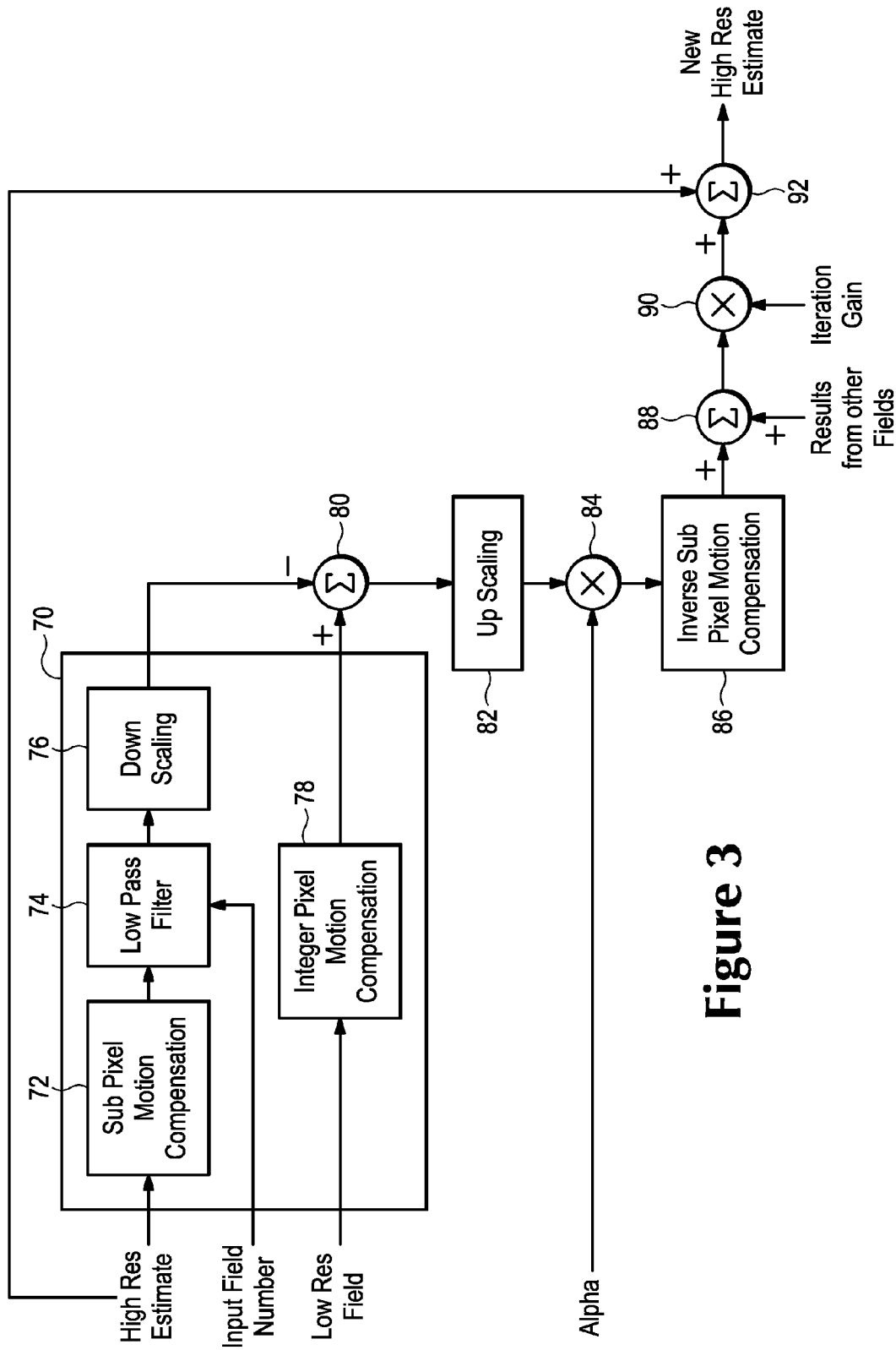
FIG. 3 shows a block diagram of an embodiment of a method of producing a super resolution video image stream.

FIG. 3 shows an embodiment of a super resolution process that accounts for a filtering process in which each field of the interlaced data undergoes a slightly different filtering process, as will be discussed in more detail further. In addition, the alpha value is applied after upscaling and the alpha value gives more weight to pixels that have more weight in the lowpass filter. The actual amount of weighting may vary from the actual lowpass filter values to more extreme values. For example, the pixel that is multiplied by $9/16$ in the lowpass filter stage 74, may receive a weight of 1 at 84, while a pixel multiplied by $7/16$ may receive a weight of 0. The filtered derived weights are in addition to other per pixel weights described above.

Returning to FIG. 3, similar to FIG. 2, estimated high resolution video data is generated from the low resolution video data received at the display device, such as 26 in FIG. 1. The process then produces estimated low resolution video data from the estimated high resolution video data in the high resolution to low resolution model 70. The estimated high resolution video data undergoes sub-pixel motion compensation at 72 and undergoes low pass filtering at 74. However, a second difference that occurs in this embodiment is that a different lowpass filter is applied depending upon the field number received at the low pass filter.

Generally, the estimated low resolution video data will be differenced against the originally received low resolution video data after motion compensation applied at 78. The estimated low resolution video data may be downsampled at 76 prior to the comparison at 80. The difference data resulting from 80 may then be upscaled at 82. The difference data will be used to generate new estimated high resolution video data.

As mentioned previously, the per-pixel weighting factor alpha is applied after upscaling at 84. The resulting weighted, upscaled, difference data then undergoes inverse sub-pixel motion estimation at 86. Results from other fields are combined at 88 and iteration gain is added at 90. This result is then combined with the original estimated high resolution video data to produce new high resolution estimated video data at 92.

An important part of this process when compared to the typical process of FIG. 2 lies in the application of different lowpass filters on the transmission end, recreated during the reception and processing of the data on the display end. The process filters the input data so that the low frequency content remains unchanged, but high frequency details that would otherwise have been lost have additional aliasing added. It should be noted that any reasonable decimation filter used for video will create aliasing of the high frequency content. From a practical standpoint, little to no additional aliasing is created to enable better super resolution playback. In the embodiments here, the filter creates slightly different aliasing for each field of a video frame. This different aliasing provides enough information for super resolution processes to recover the original, higher resolution image.

The simplest filter for decimating a video picture by ½ is to average two lines together for each output. The filter in this case can be described as a vector=[0.5, 0.5] that is convoluted with the data followed by dropping every other line. A better filter would have four taps, but for simplicity sake, coefficients that improve the frequency response of the decimated video will be ignored. If the video is to be decimated by interlacing the content, there are essentially two filters that are used to generate the two fields: [1, 0] and [0, 1].

In the discussion that follows, all the analysis shown will be for one dimension. This is completely accurate for 2:1 interlacing. The concepts being discussed can be expanded to more than one dimension and to higher interlacing factors. This would result in there being more than two fields, at least one of which will have different filter coefficients applied than those applied to other fields.

Figure 4:
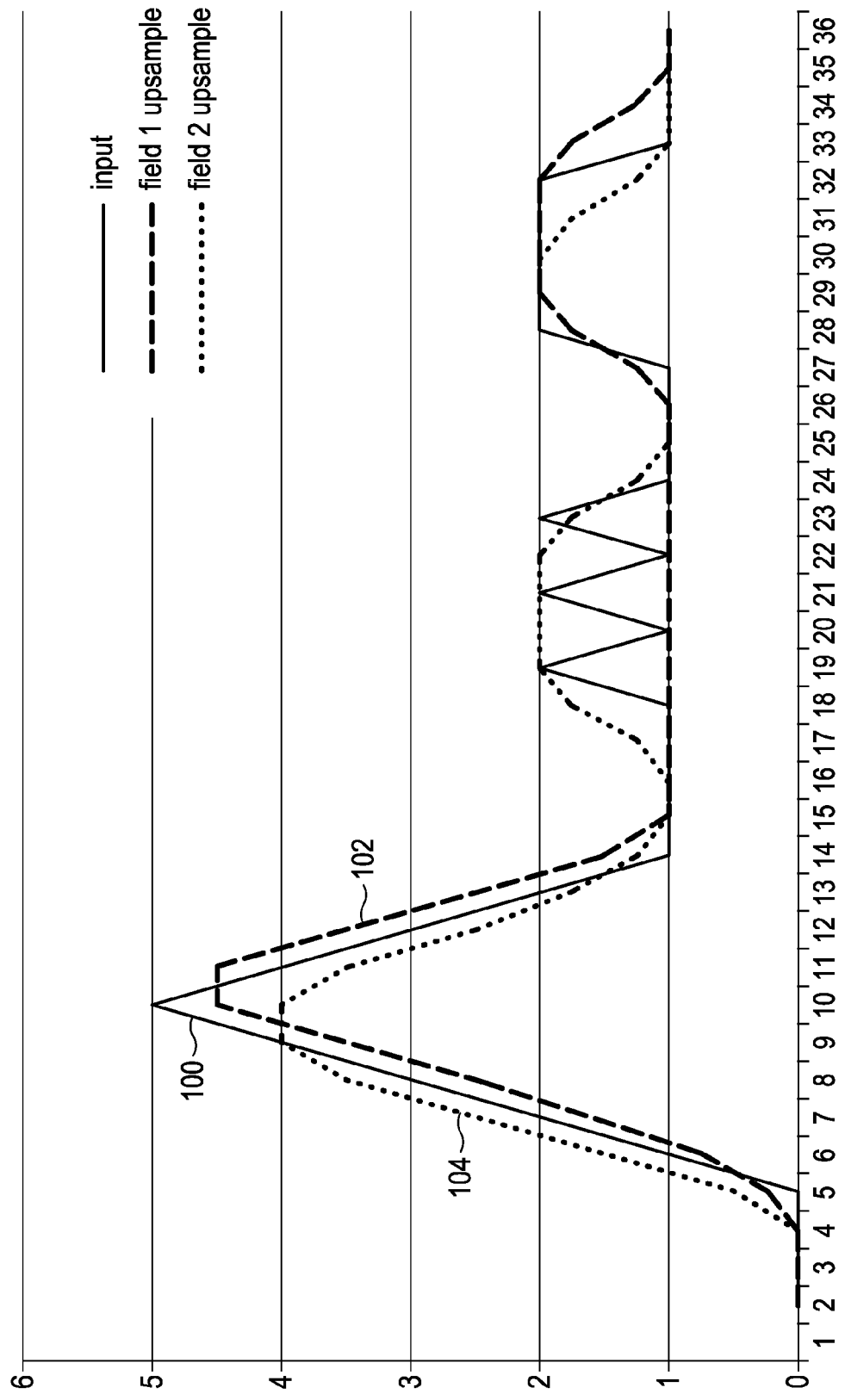
FIGS. 4-8 show graphs of spatial offsets in fields of video image data for different filtering techniques.

Using the interlaced video filters described above is unacceptable if the downstream system does not have the ability to motion adaptive de-interlace. The resulting artifacts will cause an unacceptable amount of image shaking in the vertical direction. This can be seen in the FIG. 4 where the different fields in the graph have different spatial offsets. These spatial offsets also make the motion estimation stage of the super resolution algorithm more difficult. For the discussions of FIGS. 4-8, the line 100 represents the input data, line 102 represents the field 1 upsampled data, and line 104 represents the field 2 upsampled data.

Figure 5:
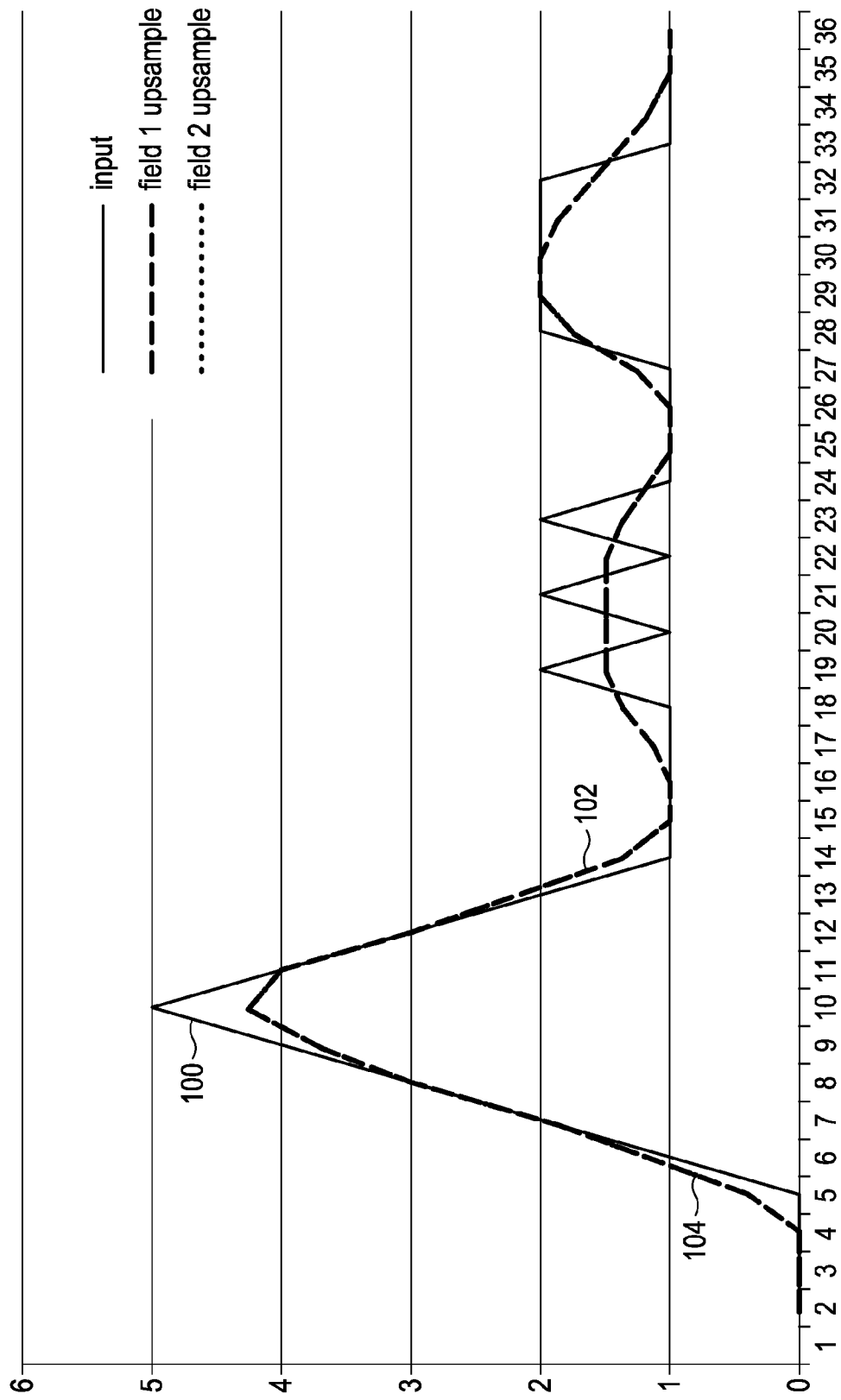

If the simple decimation filter is used instead, the vertical shaking in the image is eliminated, but both fields look exactly the same as shown in FIG. 5. This means that super resolution algorithms are unable to recover the details without any motion.

Figure 6:
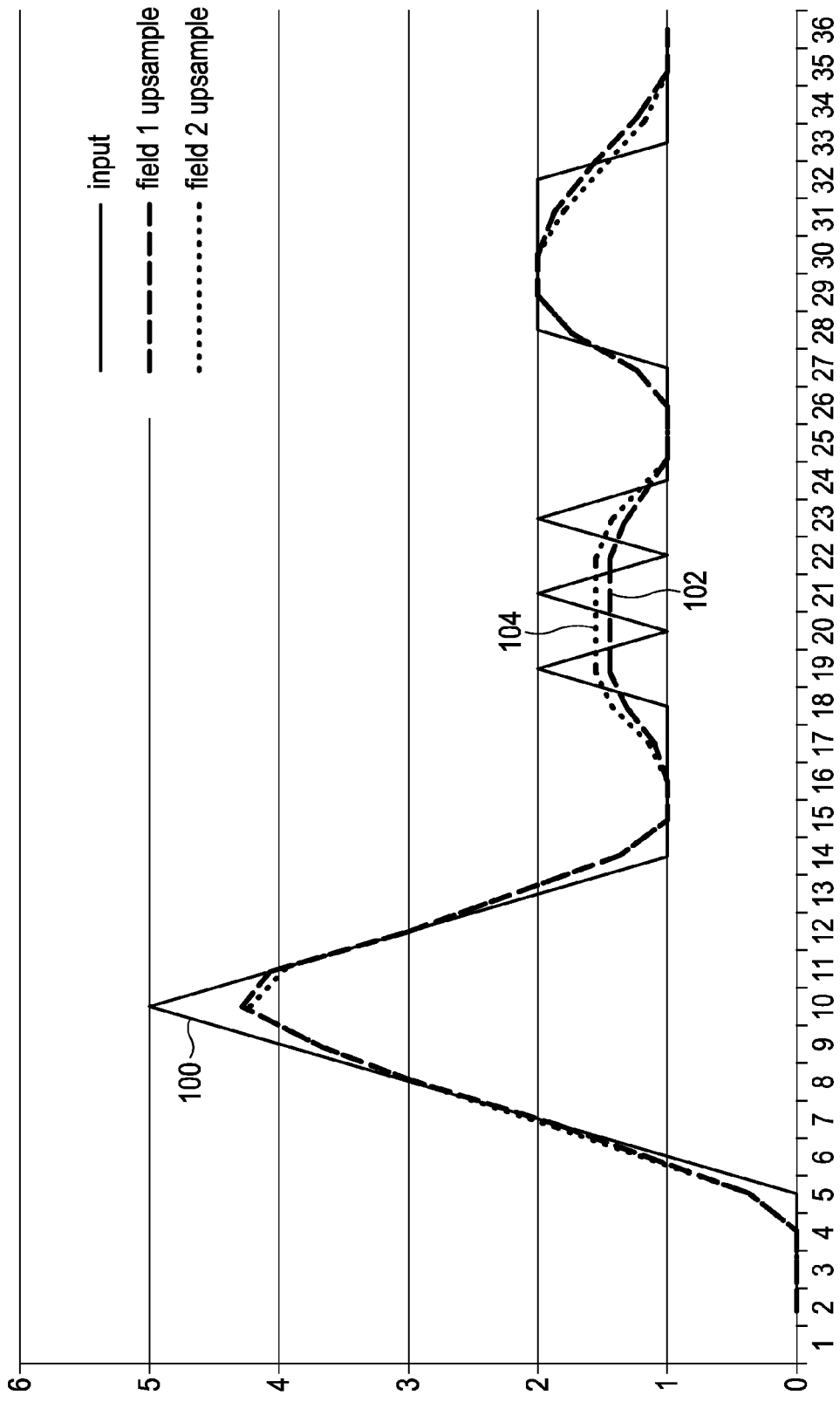

If however, the coefficients are a combination of the interlaced and simple decimation filters, the amount of shaking can be greatly reduced, while providing enough information to the super resolution algorithm to recover the details. In addition, because the spatial offsets from field to field are reduced, motion estimation is easier. In the embodiment of FIG. 6, the filter coefficients for the fields are [$9/16$, $7/16$] and [$7/16$, $9/16$].

What little shaking that remains can be further reduced by changing the 2 tap filter to a 4 tap filter. Practical decimation filters have at least 4 taps, so the change requires no additional hardware in the encoder. In the figure below the filter coefficients are [$-1/48$, $9/16$, $7/16$, $1/48$] and [$1/48$, $7/16$, $9/16$, $-1/48$]. In this case, the only significant difference between the two fields is where the high frequency burst is located, as shown in FIG. 7.

Figure 7:
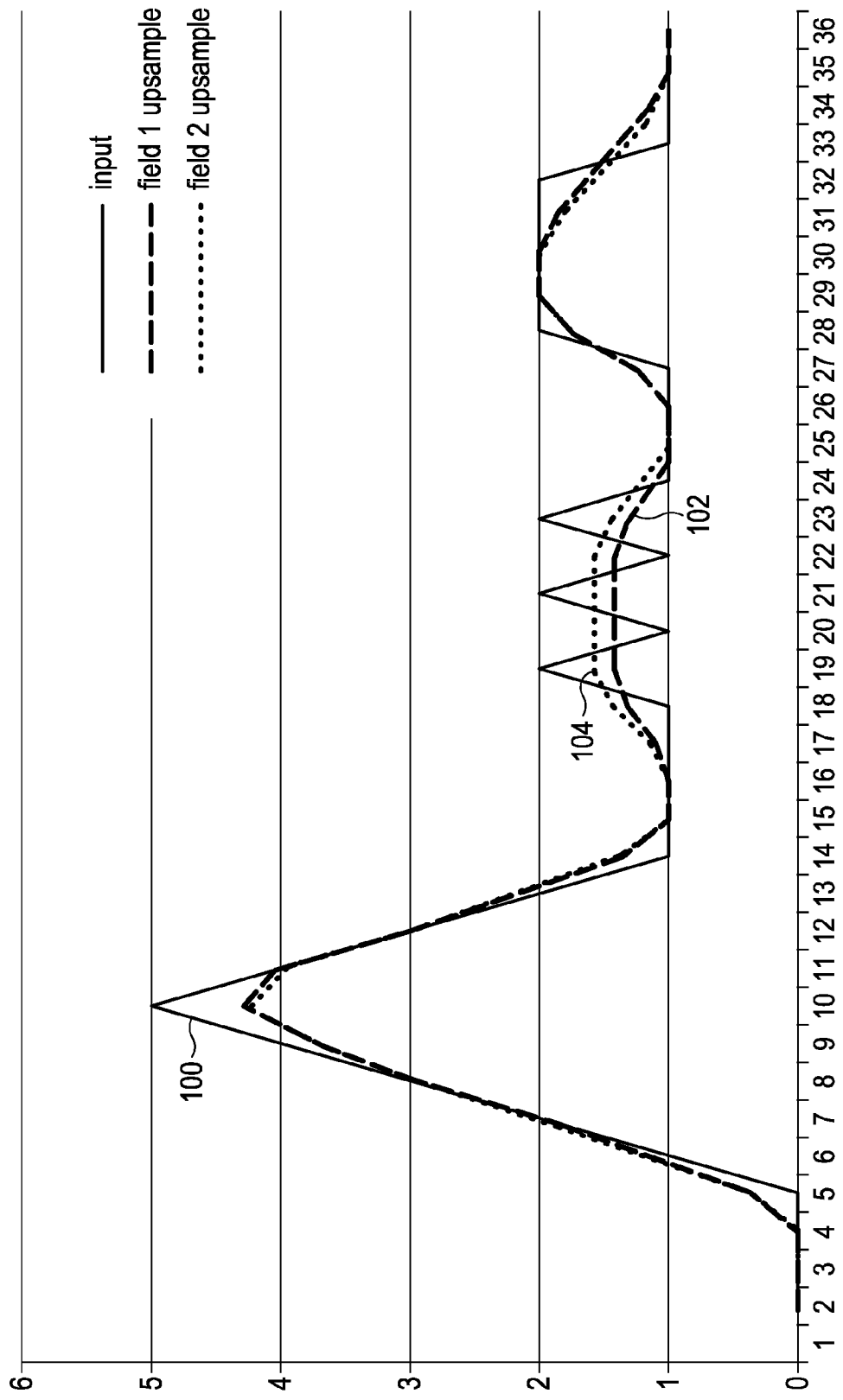
Figure 8:
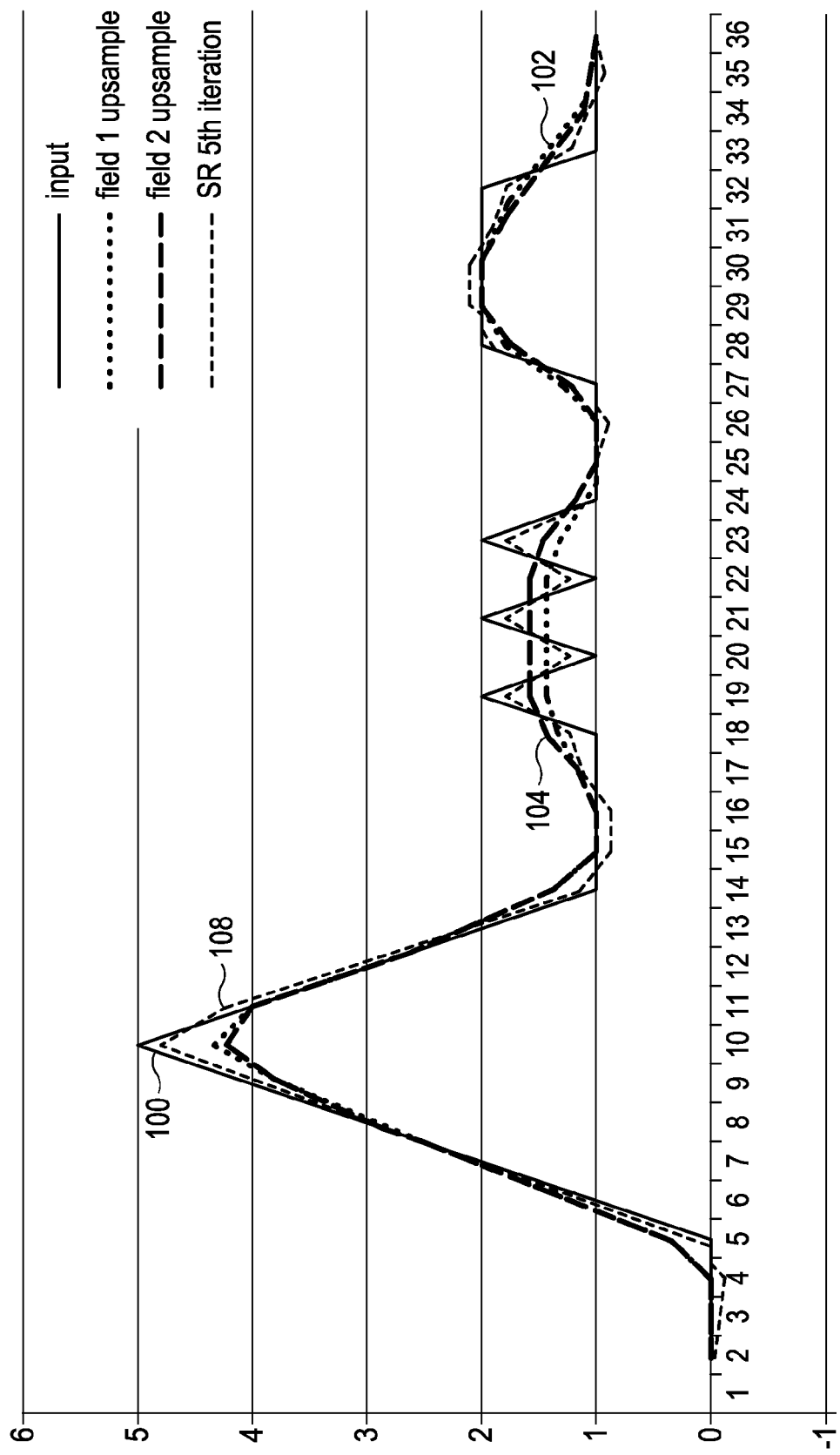

When the signal of FIG. 7 undergoes processing by a super resolution process that has knowledge of the decimation filters used for each field, the high frequency data can be recovered as shown in FIG. 8. In FIG. 8, line 108 represents the $5^{th}$ iteration of the high resolution estimate for the low resolution image data received. As can be seen, it mimics the input data closely.

This process applies to both interlaced and progressive transmission of data. For example, for 3D 720p transmission, a common practice cuts the resolution in half in the vertical direction and then combines the left and right views in a top and bottom format. The embodiments described here could control the decimation in the vertical direction to allow recovery of the original resolution. The technique can also apply to the horizontal decimation required to generate 3D 1080i content. That is, you would provide a SR encoding in the horizontal direction while providing standard interlace encoding in the vertical direction generating a 4:1 field to frame ratio.

Further it should be noted that the two portions of the system in FIG. 1 may function independently. The video transmission system may exist separate from the video display system and vice versa. While the discussion above describes specific filter coefficients and configurations, one should note that several variations and modifications of the filter lie within the scope of the embodiments.

For example, the advent of portable, powerful computing platforms with high resolution such as Apple® iPad®, makes possible rendering three-dimensional video data, such as video game graphics, at resolutions higher than typically found for personal computers or video game consoles. The 3D GPU's used in portable devices are a significant contributor to the overall power requirements and therefore impact either the weight of the device, because of the need for a larger battery, or the time between charges. For example, one graphics processing unit (GPU) core uses 0.8 Watts for rendering a 3D fighting game.

Newer versions of iPads and tablets have 4 times the pixels and to get the same performance they need to include 3 extra GPU cores. The same game will now take 4 times the power. One of the bottlenecks in the system is the number of pixels per sec that a GPU can create from the texture maps and 3D surface. The data that the GPU uses to create the output pixel is generally at a precision greater than that of the display. Because of this, the processing power required to generate an output pixel is generally related to the number of output pixels/sec or the resolution of the display, and not the resolution of the data being used to create the image for the display. The processor discussed here consists of a GPU, but could be any processor, such as a video processor, a central processing unit, etc. The system on a chip (SOC) may be also be referred to as an application processor in more general terms.

Figure 9:
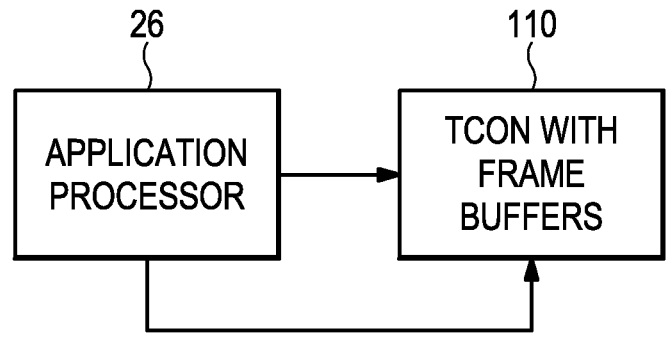
FIG. 9 shows a more detailed view of a display processor.

FIG. 9 shows a more detailed embodiment of a processor such as 26 from FIG. 1. One should note that the application processor 26 may also be the processor 16 from FIG. 1. No limitation to a particular configuration of processors and where they reside is intended, nor should any be implied. The display data, wherever processed, will ultimately be stored in a frame buffer and then sent to a timing controller (TCON). Newer versions of TCONs are now incorporating a frame buffer so that they can refresh the display while the application processor turns off the GPU. The TCON regulates the timing of the data being sent to the display device.

Figure 10:
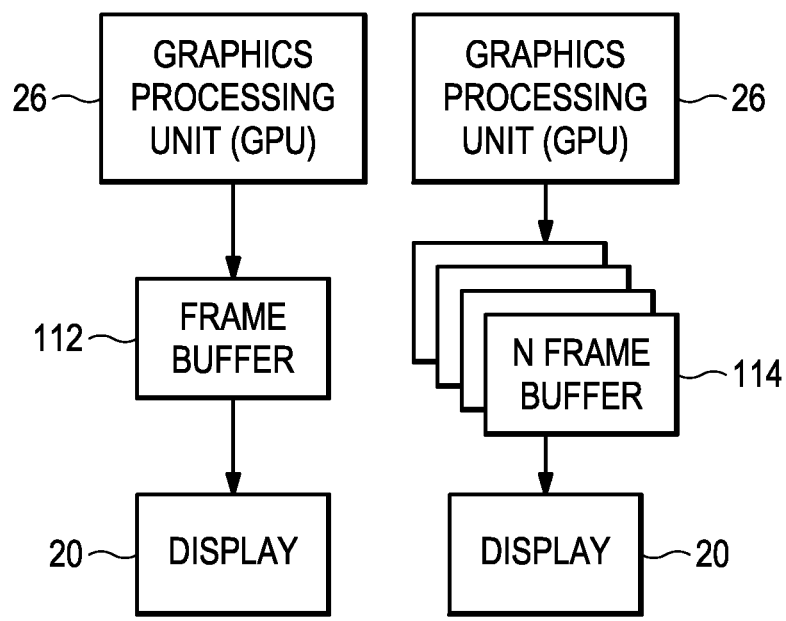
FIG. 10 shows a comparison between a current example of sending data to a display and an embodiment of a method of sending data to a display device.

In one embodiment, the TCON has sufficient processing power to recreate data transmitted at a lower resolution, applying the super resolution methods discussed above. FIG. 10 contrasts a typical method of sending data at high resolution to a display device 20 and an embodiment of a method using super resolution. On the left side of the figure, the GPU 26 sends the data to a frame buffer using a high speed data link with high data rates, which in turn sends the data to a frame buffer 112. On the right side of the figure, the GPU sends the data at a lower resolution to several different frame buffers 114. The timing controller, as an example, takes the data from the frame buffers and upscales the image as needed to obtain the high resolution desired.

Figure 11:
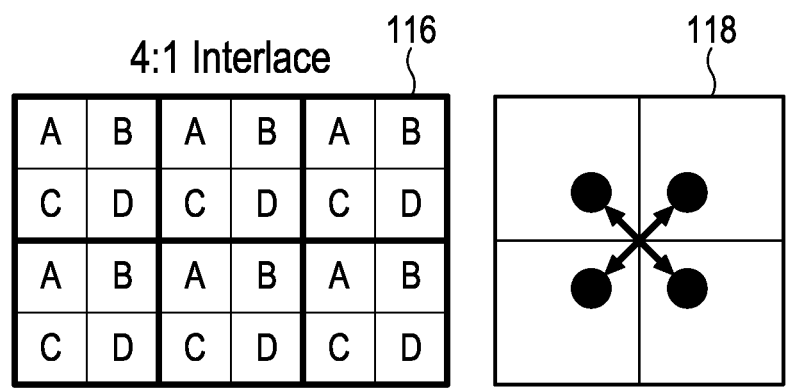
FIG. 11 shows an embodiment of a 4:1 interlace and an embodiment of offsetting an interlaced pixel value.

In one example, the GPU transmits the data at one-quarter (¼) of the final resolution, but at the same frame rate. FIG. 11 shows an example of a 4:1 interlace. The image data would be transmitted as lower resolution frames A, B, C and D with an offset from the center as shown at 116. These would then allow the TCON to upscale each frame using the neighboring frames to reach the original resolution of the image data using the super resolution processes described above, such as applying a filter with a different set of filter coefficients than is applied to at least one other field.

The upscaling process follows the same super resolution techniques discussed above to generate the 'missing' pixels. In 118, the low resolution pixel would be offset away from the middle in a different direction for each of the four different fields. Other offsets could be used, but by offsetting the pixel away from the middle of low resolution pixel causes each field to be slightly different.

Figure 12:
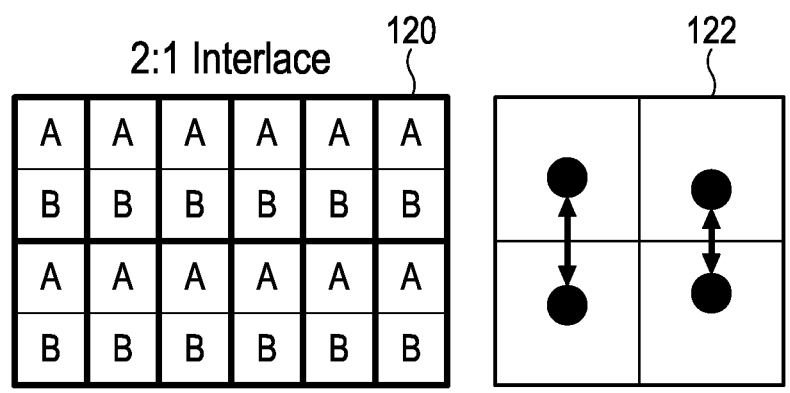
FIG. 12 shows an embodiment of a 2:1 interlace and an embodiment of offsetting an interlaced pixel value.

FIG. 12 shows an embodiment of 2:1 interlacing using fields A and B as shown at 120. In this particular example, the upscaled pixel would be offset vertically away from the center line because the interlacing is done horizontally. Also note that the low resolution pixels may not have a square aspect ratio. The interlacing could be done horizontally, vertically or even a mix of the two, where the interlacing would alternate between horizontal and vertical on a frame by frame basis.

In this manner, super resolution techniques would allow the same performance without having to increase the processing power 4 times. Increasing the processing power 4 times would increase the power consumption of the device, which makes the device less optimal as a portable device. It also increases the costs of the device dramatically. Using the techniques here, both the power consumption and the costs remain low.

The embodiments described here and its variations and modifications provide bandwidth reduction benefits associated with an interlaced picture format without the incompatibilities with systems that cannot handle interlaced video formats. The embodiments also allows super resolution processes to work with no motion in the content, as commonly occurs in video conferencing or desktop sharing applications.

Thus, although there has been described to this point a particular embodiment for a method and apparatus for super resolution encoding and playback, it is not intended that such specific references be considered as limitations upon the scope of this invention except in-so-far as set forth in the following claims.

What is claimed is:

1. A method of displaying video data, comprising:
rendering, with an graphics processor, at least two frames of pixel data at a first resolution each frame having a different offset from a center of a display frame having a display resolution higher than the first resolution;
receiving, at a timing controller, the at least two frames of pixel data from the graphics processor, wherein the timing controller controls timing of the video data being sent to a display device; and
generating the display frame of video data from the at least two frames of pixel data at the lower resolution at the timing controller.

2. The method of claim 1, wherein generating the display frame comprises using at least two neighboring frames at a lower resolution.

3. The method of claim 1, wherein generating the display frame comprises using a previous display frame and a new frame at a lower resolution.

4. The method of claim 1, further comprising deriving a-lower resolution pixel values at a center of a higher resolution pixel which are spatially in the neighboring frames.

5. The method of claim 4, wherein deriving the pixel value comprises using a location offset towards the center of the pixels from the neighboring frames.

6. The method of claim 1, wherein generating the new frames comprises using two neighboring frames to de-interlace the display frame.

7. The method of claim 1, wherein generating the new frames comprises de-interlacing the frame of video data alternatively between a horizontal direction and a vertical direction.

8. The method of claim 1, further comprising displaying a current field with less than a one field delay.

9. A video processing device, comprising:
an application processor to execute instructions causing the application processor to transmit at least two frames of image data at a resolution lower than an original resolution, each frame having an offset from a center of a display frame; and
a timing controller to execute instructions causing the timing controller to generate the display frames of image data at the original resolution from the frames of lower resolution and to control timing of the video data being sent to a display device.

10. The method of claim 1, wherein generating the display frames comprises applying a filter with a different set of coefficients to at least one neighboring frame at the lower resolution to generate a display frame of video data at a higher resolution.

11. The device of claim 9, wherein the instructions causing the timing controller further cause the timing controller to apply a filter with a different set of coefficients to at least one neighboring frame at the lower resolution to generate a display frame of video data at a higher resolution.

* * * * *